US011775553B2

(12) United States Patent
Panda

(10) Patent No.: US 11,775,553 B2
(45) Date of Patent: Oct. 3, 2023

(54) DATA INTEGRITY OF REPLICATED DATABASES

(71) Applicant: Western Digital Technologies, Inc., San Jose, CA (US)

(72) Inventor: Puspanjali Panda, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 158 days.

(21) Appl. No.: 17/218,160

(22) Filed: Mar. 31, 2021

(65) Prior Publication Data

US 2022/0107958 A1 Apr. 7, 2022

Related U.S. Application Data

(60) Provisional application No. 63/088,955, filed on Oct. 7, 2020.

(51) Int. Cl.
*G06F 16/00* (2019.01)
*G06F 16/27* (2019.01)
*H04L 9/06* (2006.01)
*H04L 9/00* (2022.01)

(52) U.S. Cl.
CPC ............ *G06F 16/27* (2019.01); *H04L 9/0618* (2013.01); *H04L 9/0643* (2013.01); *H04L 9/50* (2022.05)

(58) Field of Classification Search
None
See application file for complete search history.

(56) References Cited

U.S. PATENT DOCUMENTS

| 7,421,578 | B1* | 9/2008 | Huang | H04L 63/065 |
| | | | | 370/254 |
| 11,012,430 | B1* | 5/2021 | Hufker | H04L 63/0492 |
| 2019/0073152 | A1* | 3/2019 | Nagle | G06F 3/067 |
| 2019/0123895 | A1* | 4/2019 | Blake | H04L 67/133 |
| 2020/0126321 | A1* | 4/2020 | Swearingen | G07C 5/02 |
| 2020/0153889 | A1* | 5/2020 | Lee | H04L 67/06 |
| 2020/0226268 | A1* | 7/2020 | Zlotnick | G06F 21/64 |
| 2020/0366486 | A1* | 11/2020 | Qiu | H04L 9/3236 |

(Continued)

OTHER PUBLICATIONS

Ateniese, Giuseppe et al., "Provable data possession at untrusted stores", in Proceedings of the 14th ACM Conference on Computer and Communications Security, Oct. 29, 2007, Alexandria, USA.

(Continued)

*Primary Examiner* — Hasanul Mobin
(74) *Attorney, Agent, or Firm* — PATENT LAW WORKS LLP

(57) ABSTRACT

Disclosed herein is a system for storing a record of operations performed on a plurality of databases in which data in each database is a duplicate of a portion of data in each other database of the plurality of databases. The system comprises a plurality of servers, each server comprising a database of the plurality of databases, and a blockchain of a first distributed ledger, the blockchain of the first distributed ledger comprising one or more records of operations performed on the database, and at least one miner. Each miner comprises a blockchain of a second distributed ledger, the blockchain of the second distributed ledger comprising a record of data indicative of one or more records stored on the first distributed ledger.

20 Claims, 6 Drawing Sheets

(56) References Cited

U.S. PATENT DOCUMENTS

| | | | |
|---|---|---|---|
| 2021/0019232 A1* | 1/2021 | Murti | H04L 67/1097 |
| 2021/0099299 A1* | 4/2021 | Daniel | H04L 9/0819 |
| 2021/0117385 A1* | 4/2021 | Haldar | G06F 11/1448 |
| 2021/0365934 A1* | 11/2021 | Sano | G06Q 20/123 |

OTHER PUBLICATIONS

Bonneau, Joseph et al., "SoK: Research perspectives and challenges for bitcoin and cryptocurrencies", in 2015 IEEE Symposium on Security and Privacy, May 17, 2015, San Jose, USA.

Danezis, George and Meiklejohn, Sarah, "Centrally Banked Cryptocurrencies", in 23rd Annual Network and Distributed System Security Symposium, NDSS 2016, Feb. 24, 2016, San Diego, USA.

Eyal, I. et al., "Bitcoin-NG: a Scalable Blockchain Protocol", in 13th USENIX Symposium on Networked Systems Design and Implementation (NSDI '16), Mar. 16, 2016, Santa Clara, USA.

\* cited by examiner

DATA INTEGRITY OF REPLICATED DATABASES

TECHNICAL FIELD

This disclosure relates to systems and methods for data integrity of distributed replicated databases.

BACKGROUND

Database systems that store data across multiple sites or nodes are known as distributed databases. Some distributed databases incorporate database replication, which is the process of storing identical copies of data in more than one site or node. Data replication can provide advantages in terms of improving the availability of data in situations where multiple clients seek to access the stored data simultaneously, or at high frequency. By providing copies of data across multiple sites, a database system can enable users to access data without interfering with the data access sought by other users.

Data replication encompasses the duplicated application of database operations on each replicate database, on an ongoing basis, so that each replicate database is in a consistently updated state and is synchronized. In some implementations, there is full replication, in which the whole database is stored at every site. There can also be partial replication, in which some frequently used fragment of the database is replicated but individual databases may also contain data that is not replicated across a plurality of databases.

To ensure data consistency across the database replicates, it is necessary to implement a scheme for informing replicate databases of a data change in any other replicate, and ensuring that all replicates are updated in concert.

Cloud Federations

Distributed database architectures which include data replication have found particular application in cloud platforms. Cloud platforms may be distinguished based on resource and data management, and the related security and privacy factors. Three types of cloud platforms are a public cloud, a private cloud, and a hybrid cloud. Public clouds offer unlimited access to shared data and resources for a wide group of users, but due to the open nature of public clouds, there are limits to the security and integrity of the data stored in the public cloud.

Some cloud platforms provide federation-as-a-service (FaaS) functionality. FaaS is a service that enables the secure creation and management of cloud data and services. The intrinsic goal of cloud federations is sharing services and data among members by creating regulated, secured inter-cloud interactions. A FaaS implementation may feature advanced data security services and innovative design principles leading to a distributed and democratic cloud federation governance.

Due to the high sensitivity of the data managed by cloud federations, a FaaS implementation must provide assurances about the integrity of data stored in databases of the cloud federation, and compliance of cloud member contracts. Namely, to ensure non-repudiable evidence records of contract enforcement, all the inter-cloud database operations have to be monitored and the logs stored with strong integrity guarantees.

Additionally, to foster a wide adoption of cloud federations, FaaS advocates the absence of a centralized governance. Among federation members, there is no designated leader. Rather federation members form a network of peers. FaaS seeks to establish a decentralized, democratic federation governance. To this aim, a FaaS must rely on clearly defined protocols for managing distributed databases to ensure strong data integrity.

Data Integrity and Storage Efficiency

Ensuring data integrity is a known challenge for data storage systems, especially for distributed data storage systems, such as cloud environments. The task of checking data integrity, for an individual data owner, is computationally complex and time consuming, due to the large amount of data to be examined and checked for integrity.

Some distributed data storage solutions provide a client application, which enables a data owner to verify the integrity of the remotely stored data on a single server, without having to download the data. For a cloud environments, in which the data is stored across a distribution, Remote Data Auditing (RDA) is a solution to enable auditability through a trusted third party. The use of a trusted third party alleviates the computation burden on the user, however, these techniques rely on the assumption that the third party is trusted. If the third party acts maliciously, they can no longer ensure integrity.

Accordingly, there is a need to provide integrity of data stored in a distributed replicated database system that does not rely upon a trusted third party.

Any discussion of the prior art throughout the specification should in no way be considered as an admission that such prior art is widely known or forms part if the common general knowledge in the field.

Throughout this specification the word 'comprise', or variations such as 'comprises' or 'comprising', will be understood to imply the inclusion of a stated element, integer or step, or group of elements, integers or steps, but not the exclusion of any other element, integer or step, or group of elements, integers or steps.

SUMMARY

The present disclosure provides a database system comprising distributed database replicas, and a two-layer blockchain architecture which works to ensure the integrity of the data stored on the distributed replica databases.

The two-layer blockchain architecture comprises a first-layer blockchain including a light-weight consensus mechanism to provide data integrity at a high throughput, and a second-layer blockchain including a proof-of-work mechanism to provide strong data integrity of the first-layer blockchain.

Disclosed herein is a system for storing a record of operations performed on a plurality of databases in which data in each database is a duplicate of a portion of data in each other database of the plurality of databases. The system comprises a plurality of servers. Each server comprises a database of the plurality of databases, and a blockchain of a first distributed ledger, the blockchain of the first distributed ledger comprising one or more records of operations performed on the database, and at least one miner. Each miner comprises a blockchain of a second distributed ledger, the blockchain of the second distributed ledger comprising a record of data indicating one or more records stored on the first distributed ledger.

In one embodiment, each server of the plurality of servers is configured to, in response to receiving a command to perform a database operation, indicate consent to perform the database operation, determine, by applying a consensus mechanism, that each server of the plurality of servers consents to perform the database operation, perform the database operation on the server's database, and store a record of the performed database operation in the server's blockchain of a first distributed ledger.

In one embodiment, each miner is configured to, in response to an anchoring event, receive an anchor data indicating one or more records stored on the first distributed ledger, complete a proof-of-work operation based on the anchor data, and record, in the miner's blockchain of the second distributed ledger, a record based on the anchor data.

Also disclosed herein is a method for recording operations performed on a plurality of databases, each database of the plurality of databases comprising a portion of data that is a duplicate of a portion of data in each other database of the plurality of databases. The method comprises, for each database of the plurality of databases, recording, in a first distributed ledger, one or more records indicating operations performed on the database, and recording, in a second distributed ledger, a record indicating the one or more records stored in the first distributed ledger.

In one embodiment, the method further comprises, in response to an anchoring event, receiving anchor data, being data indicating one or more records stored on the first distributed ledger, completing a proof-of-work operation based on the anchor data, and recording, in the second distributed ledger, a record based on the anchor data.

In one embodiment, the method further comprises for each database of the plurality of databases, in response to receiving a command to perform a database operation, consenting to perform the database operation on the database, determining, by applying a consensus mechanism, that consent has been given to perform the database operation on each database of the plurality of databases, performing the database operation on the database, and recording, in the first distributed ledger, a record of the performed database operation.

In one embodiment, the method is performed by components of a database system. The components of the database system comprise, a plurality of servers, each server of the plurality of servers associated with one database of a plurality of databases. In one embodiment, the components of the database system further comprise at least one miner.

In one embodiment, each server of the plurality of servers is configured to, in response to receiving a command to perform a database operation, indicate consent to perform the database operation, determine, by applying a consensus mechanism, that each server of the plurality of servers consents to perform the database operation, perform the database operation on the server's database, and store a record of the performed database operation in the server's blockchain of a first distributed ledger.

In one embodiment, the method further comprises performing, by one server of the plurality of servers, a role of lead server in accordance with an election protocol. In one embodiment, the election protocol defines an election of each server of the plurality of servers to the role of lead server in turn. In one embodiment, the consensus mechanism comprises the steps of receiving, by the lead server, operation information indicating a database operation, producing, by the lead server, an indication of consent to perform the database operation on the lead server's database, and communicating, by the lead server, the indication of consent to one or more of the servers of the plurality of servers.

In one embodiment, the method further comprises the step of determining, by the lead server, the indication of consent by cryptographically signing the operation information using a private cryptographic key of the lead server.

In one embodiment, the method further comprising the steps of, in response to an anchoring event, receiving, by the at least one miner, an anchor data indicating one or more records stored on the first distributed ledger, completing, by the at least one miner, a proof-of-work operation based on the anchor data, and recording, by the at least one miner, in the miner's blockchain of the second distributed ledger, a record based on the anchor data.

In one embodiment, the method further comprises performing, by one server of the plurality of servers, a role of lead server in accordance with an election protocol, and signalling, by the lead server, the anchoring event to the at least one miner.

In one embodiment, the anchoring event is signalled periodically based on a time interval, or the anchoring event is signalled based on a number of operations performed on the plurality of databases. In one embodiment, the anchor data comprises hash values indicating operations performed on the plurality of databases.

In one embodiment, the at least one miner comprises a plurality of miners. Each miner performs the steps of, in response to receiving a proof-of-work solution determined by another miner of the plurality of miners, determining whether the proof-of-work solution is valid, and, in response to determining that the proof-of-work solution is valid, recording, in the miner's blockchain of the second distributed ledger, a record based on the anchor data.

Also disclosed herein is a system for storing a record of operations performed on a first database, in which data in the database is a duplicate of a portion of data in a second database. The system comprises a processor, the first database, and a blockchain of a first distributed ledger. The processor is configured to, in response to receiving a command to perform a database operation, indicate consent to perform the database operation, determine that consent has been indicated to perform the database operation on the second database, perform the database operation on the first database, and store a record of the performed database operation in the blockchain of the first distributed ledger.

In one embodiment, the consensus mechanism comprises the step of producing, for each database of the plurality of databases, an indication of consent to perform the database operation on the database of the plurality of databases.

Also disclosed herein is a device for recording operations performed on a plurality of databases, each database of the plurality of databases comprising a portion of data that is a duplicate of a portion of data in each other database of the plurality of databases. The device comprises means for, for each database of the plurality of databases, recording, in a first distributed ledger, one or more records indicating operations performed on the database, and means for recording, in a second distributed ledger, a record indicating the one or more records stored in the first distributed ledger.

BRIEF DESCRIPTION OF DRAWINGS

The embodiments of the disclosure will now be described with reference to the accompanying drawings, in which.

DESCRIPTION OF EMBODIMENTS

Figure 1:
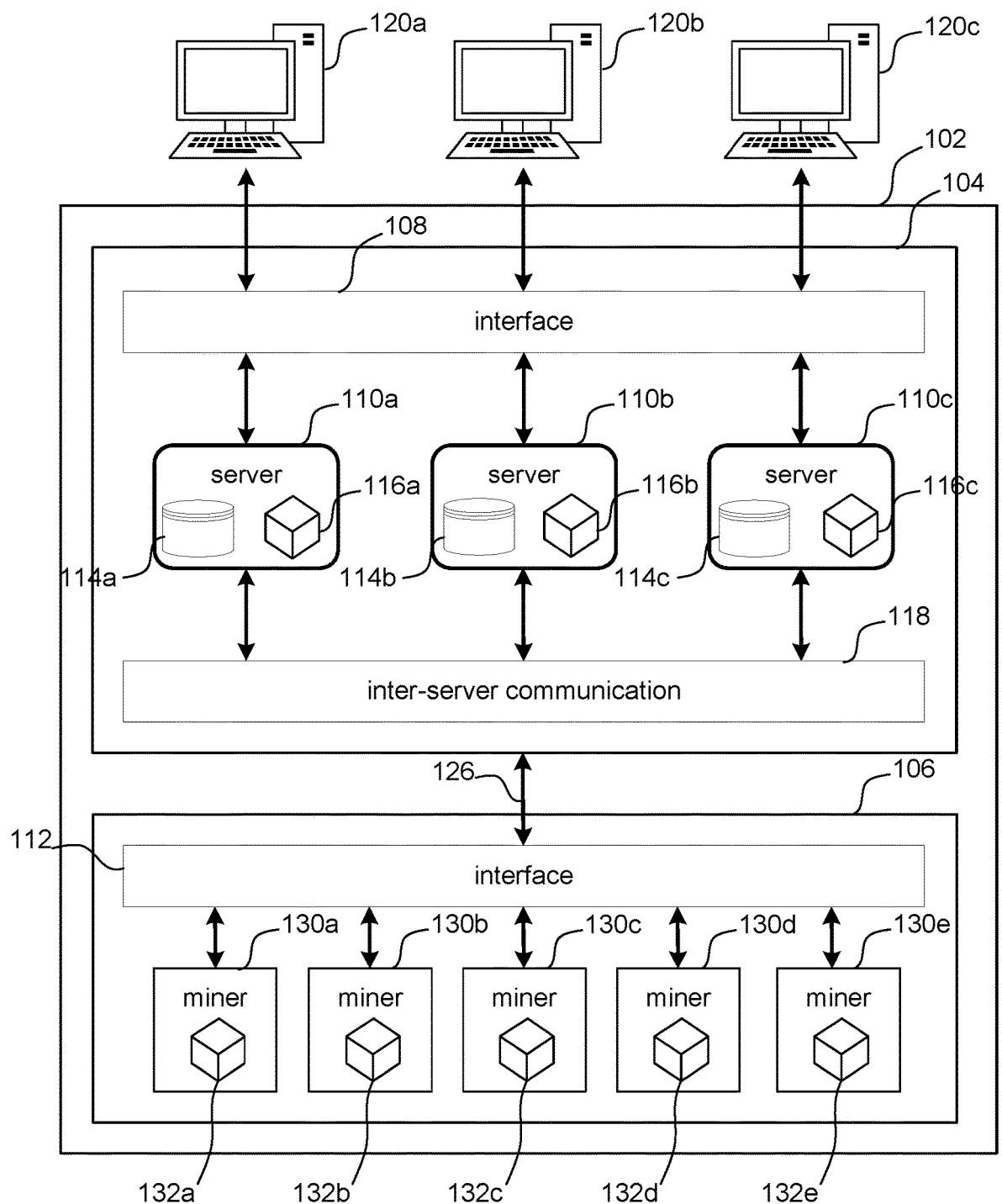
FIG. 1 is a block diagram illustrating a database system, according to an embodiment.

In the present disclosure, a database system employs two levels of blockchain infrastructure to provide high throughput recording of database operations via a first-layer blockchain that utilizes a lightweight consensus mechanism, and higher data integrity recording of database operations via a second-layer blockchain that incorporates a proof-of-work mechanism.

Blockchain

A blockchain is a shared ledger which is maintained by a plurality of nodes within a peer-to-peer network. The blockchain as a concept was initially defined in the infrastructure of Bitcoin. Since then, the concept has been generalized into distributed ledgers that use the blockchain to verify and store any records without needing cryptocurrency or tokens. In the present disclosure, the blockchain concept is applied to ensure database integrity for a distributed system of replicated databases.

A blockchain does not rely on any central trusted authority like traditional banking and payment systems. Instead, trust is achieved as an emergent property from the interactions between nodes within the network. A full copy of the blockchain contains every transaction or operation ever executed within the blockchain network. The shared ledger maintained by a blockchain is provably robust against forging or hacking Therefore, a party can rely on the shared ledger as an accurate record of transactions or operations executed within the blockchain network. One significant consequence of this is that it is not necessary to utilize a trusted third party, such as a database controller for approving database operations.

Computers running the blockchain code are able to communicate with each other via a communications network such as the Internet. Computers in the blockchain network are referred to as servers or miners.

Blockchain Blocks

In blockchain systems, data records (such as database operations) are recorded in blocks. Each block further contains a mathematical function calculation, called a hash, of the previous block. This mathematical function calculation is easy to calculate given a specific transaction but difficult to reverse given a specific hash. This represents a means to determine whether content in the block has been modified in any way.

Including the hash in a blockchain block creates a chain where any changes made to a block will change that block's hash, which must be recomputed and stored in the next block. This changes the hash of the next block, which must also be recomputed and so on until the end of the chain. Therefore, each block is also linked to the previous block (the 'parent' block) by containing a reference the previous block. This has the effect of creating a chain of blocks from the current block to the very first block known as the genesis block. Each block is guaranteed to come after the previous block chronologically because the previous block's hash would otherwise not be known. Each block is also computationally impractical to modify once further sequential blocks have been added because every block after it would also have to be regenerated. These properties can be leveraged to make records of database operations, as stored on blockchain, unalterable and immutable.

The current disclosure uses the term 'blockchain' to refer to actual blockchain itself (that is, the distributed ledger with blocks added sequentially).

Proof-of-Work

To enhance the integrity of the blocks that are appended to the blockchain, blockchain systems may employ a proof-of-work mechanism. In a blockchain that uses a proof-of-work function, nodes known as miners, compete to find a solution to a computationally complex problem based upon the transaction data and a defined algorithm.

Responsive to a first miner identifying a solution to the problem, the other miners in the blockchain system verify the correctness of the first miner's solution. If there is consensus that the solution is correct, the first miner earns the right to add a new block to the blockchain. The solution to the problem becomes the hash value of the new block and all miners add the new block to their respective blockchains.

There are many different proof-of-work schemes. A key feature of a proof-of-work scheme is its asymmetry. The work must be moderately hard, yet feasible, for a miner to complete, but easy for other miners to check and verify the correctness of the solution.

From a performance perspective, blockchain implementations that incorporate a proof-of-work requirement have a main drawback in that the proof-of-work is computationally complex and time consuming to perform. This results is a reduction in the speed at which new blocks can be added to the blockchain.

The present disclosure provides a database system in which operations are recorded in blocks of a blockchain, in the order in which the operations are performed on a database. In such a system, the latency in generating new blocks acts as a constraint to the throughput of database operations. In other words, including a proof-of-work requirement on a blockchain will constrain the speed at which operations can be performed on database data. For many situations, such a constraint would not be desirable.

Two-Layer Blockchain Architecture

To address the issues of data security and performance requirements, embodiments of the present disclosure utilize a distributed ledger, in the form of a blockchain, to record all database operations that have occurred across the system of distributed replicated databases, therefore providing tamper-proof immutable record of the current state of the replicated data.

More specifically, the present disclosure provides a two-layer blockchain architecture comprising a first-layer blockchain and a second-layer blockchain. The first-layer blockchain includes a light-weight consensus mechanism to provide data integrity at a high throughput. The second-layer blockchain includes a proof-of-work mechanism to provide strong data integrity. The two layer blockchain architecture makes use of a rotation consensus mechanism in the first-layer and a proof-of-work mechanism in the second-layer.

Two Complementary Layers

A network of distributed nodes, called servers, form the system of distributed replicated databases. The servers employ a rotation consensus mechanism to control the addition of blocks to the first-layer blockchain. The rotation consensus mechanism assures low latency and high throughput of database operations, which is important to enable the users to experience high database responsiveness.

Accordingly, the first-layer provides quick and reliable storage of records of every operation carried out on the database system; however, the data integrity of the first-layer blockchain may be considered not as strong as necessary because the first-layer blockchain does not utilize a proof-of-work mechanism.

To complement the first-layer, the second-layer comprises a proof-of-work-based blockchain that stores blocks which are a record of parts of the database operations recorded by the first-layer. The second-layer blockchain provides assurances that the first-layer blockchain is an accurate record of the operations performed on the replicated data.

The blocks of the second-layer blockchain are added with strong data integrity, due to the proof-of-work requirement, but there is a processing latency involved with adding each block, due to the computation complexity of the proof-of-work requirement.

The interaction between the two layers provides effective assurances on data integrity at a desirable throughput. From the point of view of a client of the database system, an operation on the database is completed as soon as it is performed by the first-layer blockchain, and the high-latency proof-of-work mechanism is invisible to the client.

FIG. 1—Architecture

FIG. 1 is a block diagram illustrating a database system 102, according to an embodiment. The database system 102 may be a federated database system which provides federation-as-a-service. The database system 102 comprises a first-layer 104 and a second-layer 106. The first-layer 104 comprises a plurality of servers 110a-c. The servers 110a-c can also be considered to be members of the federated database system 102, e.g. federation members.

Each server 110a-c comprises a data storage component in the form of a database 114a-c. Each server's database 114a-c stores data. A portion of the data stored in each server's database 114a-c is data that has been replicated across each of the servers' databases. For example, server 110a comprises database 114a. A portion of the data stored in database 114a is also stored in databases 114b and 114c. However, in some embodiments, database 114a may also store additional data, which is not stored in databases 114b and 114c. Accordingly, the databases of a database system all share a portion of replicated data, but may also store additional data which is not replicated, or replicated across only some of the other databases of the database system, or replicated across databases in other database systems.

Each server 110a-c also comprises a blockchain ledger component 116a-c. The blockchain ledger 116a-c provides a record of operations that have been performed on the database component 114a-c of the server 110a-c. Together the blockchain ledgers 116a-c form the distributed blockchain ledger of the first-layer 104. The first-layer blockchain 116a-c is a permissioned blockchain, meaning that membership in the blockchain is restricted to servers that have permission to be a part of the first-layer blockchain.

The components of the servers 110a-c will be described in further detail in relation to FIG. 2.

The servers 110a-c are each communicably coupled to the other servers in the database system 102 via an inter-server communication channel 118. In one embodiment, the inter-server communication channel 118 operates over the Internet via an internet protocol. In one embodiment, the inter-server communication channel is a secured channel in which communications are encrypted. In one embodiment, the inter-server communication channel 118 supports broadcast messages which can be received by a plurality of servers connected to the inter-server communication channel 118. In other embodiments the inter-server communication channel may use a combination of two or more different communication protocols.

The first-layer 102 further comprises an interface 104. Interface 108 receives database operation commands from one or more clients 120a-c. Interface 108 may comprise a single entity; however, in most implementations, servers 110a-c will be geographically distributed. Accordingly, interface 108 may comprise a plurality of interfaces which function in concert to provide a virtual interface to the database system 102.

FIG. 1 also illustrates clients 120a-c of the database system 102. The clients are entities that are permissioned to perform database operations on the databases of the database system 102. The clients may be individual computers, or may be a networked group of entities, such as another federated cloud system.

Each of the clients 120a-c is communicably coupled to interface 108 of the database system 102. In the embodiment illustrated in FIG. 1, each of the clients 120a-c has an individual and direct communication channel with the interface 108. In other implementations, some or all of the clients 120a-c may share a communication channel to communicate with the interface 108. The clients 120a-c may communicate with the interface 108 through one or more nodes or hubs.

The clients 120a-c send database operation commands to the database system 102, which are received by interface 108. For example, a client may send a read command, a write command or a data modify command.

The database system 102 may be administered by a system administrator, which configures the components of the database system 102 for performance and functionality.

Database Operations

The clients 120a-c operating on the database system 102 issue operations through the database interface 108. After reaching consensus through the rotation consensus mechanism, the servers 110a-c execute the operations on their database replicas 114a-c, and store a record of the operation being performed, in their first-layer blockchain 116a-c.

In one embodiment, the servers 110a-c are configured to only record on the blockchain ledger operations that modify the contents of the database, for example write, modify, add, delete or merge operations. In another embodiment, the servers 110a-c record all operations performed on the database, including read and copy operations.

Consensus Mechanism

Responsive to the database system 102 receiving a database operation command from a client, the servers 110a-c perform a consensus mechanism to establish a consensus to perform the database operation on the database replicas.

The consensus mechanism ensures that all of the servers 110a-c of the database system 102 consent to perform the database operation. Therefore, there cannot be any database operation completed without all the servers having consented to the operation being performed.

In broad principle, the consensus mechanism operates through one of the plurality of servers 110a-c acting as a lead server to receive a database operation command from a client, and seeking the consent of all of the other servers 110a-c.

Rotation of the Consensus Mechanism

The consensus mechanism has a rotation aspect. A rotation algorithm defines an election protocol which defines the order in which the servers take turns performing the role of lead server, and defines the trigger for electing a new server to the role of lead server.

The rotation of the lead server role can operate on a time basis. For example, in one embodiment, the rotation consensus mechanism divides the time into rounds, and for each round, elects a server as a lead server. In another embodiment, the rotation consensus mechanism determines when to switch leaders based on the number of operations performed on databases in the database system 102. For example, each server performs the role of lead server for a set number of operations, then the role of lead server is switched to another server.

A server may be elected to the lead server role in random order, in a set order, or based upon dynamic parameters such as current workload and availability. A server may be elected to the lead server role by a system administrator. A system administrator may elect a lead server on a monthly, quarterly, yearly or other time basis. The database system may include a web interface, via which a system administrator can elect a server to the lead server role. A backup lead server may be elected for redundancy, wherein the backup lead server assumes the role of lead server in the event that the elected lead server is inoperative.

In one embodiment, the servers communicate with one or more other servers to switch which server is in the lead server role. In other embodiments, the rotation consensus mechanism does not require that the servers communicate with one another to switch the leadership role. For example, if the rotation algorithm is based on set time periods, and the servers are rotated into the lead server role in a set order, a server may maintain its own awareness as to whether it is currently in the role of lead server.

Lead Server Role

When in the lead server role, a server (for example 110a) is responsible for receiving new database operation command from clients 120a-c via the interface 108, signing the new operations with server's private key, and communicating the new operations to the other servers 110b-c via the inter-server communication channel 118.

Receiving Operation Commands from the Interface

The mechanism via which the lead server receives new database operations from clients may vary across embodiments. For example, in one embodiment, all servers are able to receive operation command, but only the server in the lead server role acts upon the operation commands. Alternatively, the interface 108 may be configured with awareness of the current identity of the lead server and may direct all operation commands only to that lead server.

Non-Lead Servers

Responsive to a server (for example server 110b), who is not currently in the role of lead server, receiving operation information that has been signed by the lead server 110a, the server 110b verifies that the operation information has been signed by the lead server 110a, and applies the server's 110b own signature to the operation information to indicate the server's 110b consent to perform the operation.

In one embodiment, each server 110a-c of the database system 102 indicates their consent to perform the operation via a communication loop, such that each of the servers is configured with identification details of a next server in the loop, and each server signs the operation information and forwards the signed operation information to the next server in the loop.

In one example, with reference to the embodiment illustrated in FIG. 1, servers 110a-c are configured to be in a communication loop and server 110a is currently the lead server. Server 110a's next server is server 110b. Server 110b's next server is 110c, and server 110c's next server is server 110a. Accordingly servers 110a, 110b and 110c each append their signature (indicating consent) to the operation, and the signed operation is communicated back to server 110a with the signatures of all servers appended to the operation.

Once all the server 110a-c of the database system 102 have indicated their consent to perform the operation, each server applies the new operation to their local database replica 114a-c and records the new operation in their local blockchain ledger 116a.

In one embodiment, each server in the database system is configured with details of the communication loop in response to all of the servers of the database system being finalized.

Second-Layer

The second-layer 106 of the database system 102 comprises a plurality of computational devices known as miners (or mining entities) 130a-e. The miners maintain a distributed ledger in the form of a blockchain employing a proof-of-work requirement.

The second-layer 106 includes an interface 112, via which the miners 130a-e receive records from the first-layer 104. The records comprise portions of the blocks of the blockchain 116a-c of the first-layer 104. The miners work to satisfy the proof-of-work requirement to thereby earn the right to obtain a records from the first-layer and to add the record to the second-layer blockchain. The records comprise anchor data which is a portion of the first-layer blockchain and is described in more depth below.

As noted above, the inclusion of a proof-of-work requirement on a blockchain makes it highly impractical to alter data in a block after the block has been appended to the blockchain. Therefore, the second-layer blockchain provides an immutable record of operations that have been recorded on the first-layer blockchain. In short, the first-layer blockchain acts as a type of buffer between a client and the proof-of-work blockchain of the second-layer, which makes the high-latency proof-of-work mechanism invisible to the client.

Figure 2:
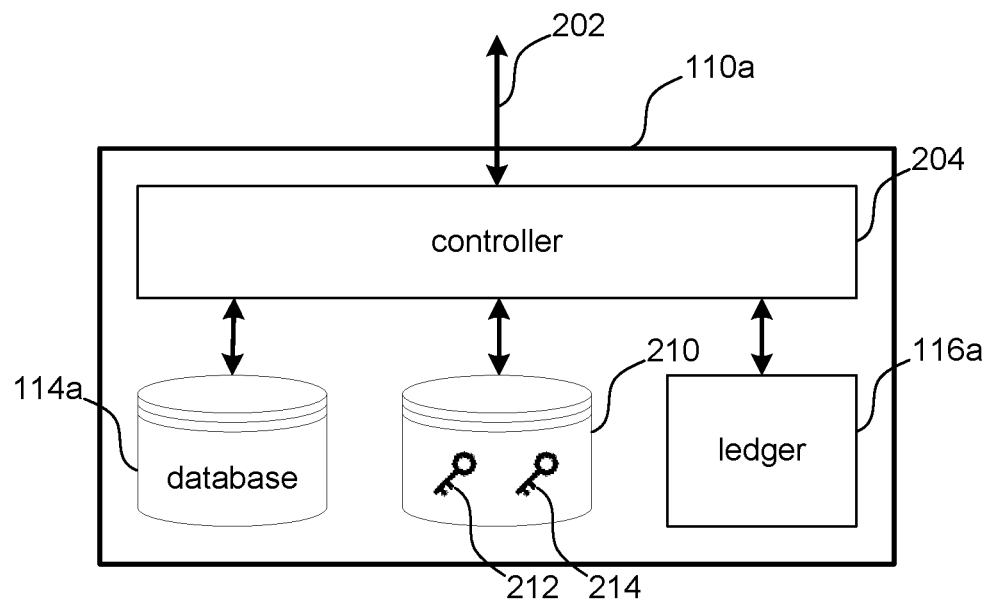
FIG. 2 is a block diagram illustrating the components of a server, according to an embodiment.

FIG. 2—Server Architecture

FIG. 2 is a block diagram illustrating the components of server 110a of the database system 102 illustrated in FIG. 1, according to an embodiment. Server 110a comprises a controller 204 which is communicatively coupled to the interface 108 of the database system 102. The controller is a processing device (or processor) which controls the function of the server 110a. When server 110a is performing the role of the lead server in the database system 102, the controller 204 receives database operation commands from the interface 108, and signs the operation commands, and communicates the signed operation commands to the other servers in the database system 102.

Server 110a further comprises a database 114a, which comprises at least a portion of the database which is a replica of a portion of database of the other servers (110b and 110c) in the database system 102.

Additionally, server 110a includes a ledger 116a stored in non-volatile memory. The ledger comprising a chain of blocks, recording operations performed on the database 114a.

Server 110a also comprises a memory store 210 which stores keys used for authenticated communication with the other servers of the database system 102. More specifically, memory store 210 stores at least one private key 212 which server 110a uses to sign communication which is sent to other servers of the database system 102. Server 110a may also store additional private keys in memory store 210, for example a private key which server 110a uses to calculate a block hash during creation of blockchain blocks.

Memory store 210 also stores a plurality of public keys 214, each associated with one of the other servers of the database system 102. For example, server 110a stores a public key associated with server 110b, and a public key associated with server 110c. Server 110a uses the public keys to authenticate messages received from other servers of the database system 102.

Figure 3:
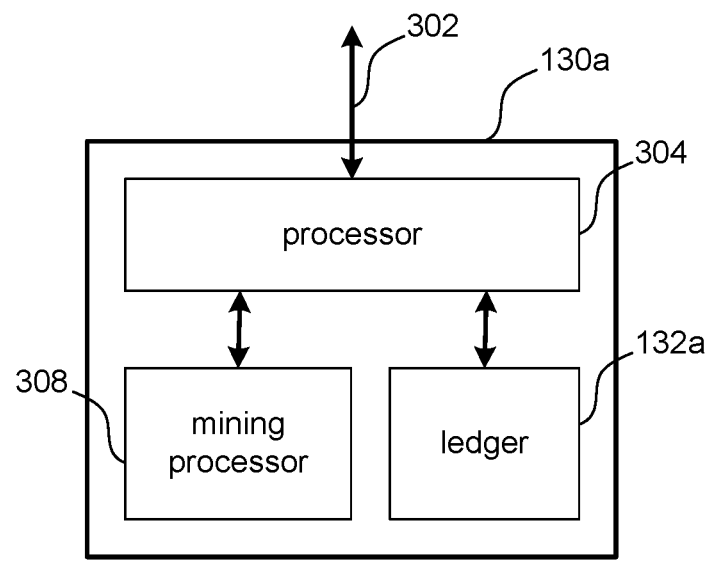
FIG. 3 is a block diagram illustrating the components of a miner, according to an embodiment.

FIG. 3—Miner Architecture

The miners (or mining entities) of the second-layer 106 of the database system 102 maintain the second-layer blockchain of the database system, including performing the proof-of-work function. The miners of a database system need not be uniform in terms of architecture, structure, performance and capabilities. A miner may be a specific purpose, separate computer device configured for performing the mining operations. Alternatively, a miner may be a component of a computer device that is configured to perform a plurality of functions. In one embodiment, a miner comprises a software component executing on a server.

FIG. 3 is a block diagram illustrating the components of miner 130a of the second-layer 106 of the database system 102, according to an embodiment. Miner 130a is communicatively coupled to servers 120a-c of the first-layer 104 of the database system 102, via connection 302.

Miner 130a comprises a processor component 304 which controls the function of miner 130a. Miner 130a further comprises a mining processor 308 which performs the computationally complex mining operation as defined by the proof-of-work requirement for the second-layer blockchain. The mining processor 308 may comprise a plurality of processing elements, which function in concert to perform the proof-of-work requirement.

Miner 130a further comprises a blockchain ledger 132a which is stored in non-volatile memory. In the ledger 132a, miner 130a stores blocks which record operations performed on the databases 114a-c of the database system 102.

Figure 4:
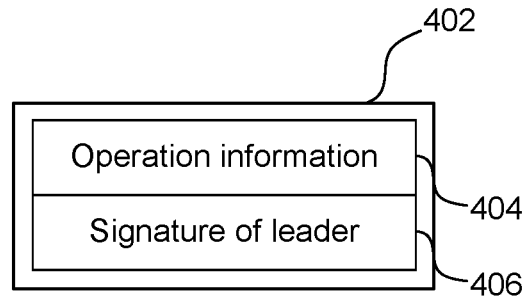
FIG. 4 illustrates the data components of a signed operation command, according to an embodiment.

FIG. 4—Components of a Signed Operation Command

FIG. 4 illustrates the data components of a signed operation command, according to an embodiment. A signed operation command is a unit of information that comprises: information 404 defining an operation command received by the database system 102 from a client 120a-c; and a signature 406 of the server that is elected as the lead server.

In one embodiment, the operation information 404 includes an indication of operation type as selected from a list comprising: read; write; merge; delete; copy; and add. In other embodiments, the list of operation types supported by a database may include other operation types depending upon the functionality supported by the databases 114a-c of the database system 102.

The operation information 404 further comprises an indication of a position in the database at which the operation is to be performed. For some operation types, for example 'write' operations, the information 404 further comprises data associated with the operation.

The signature 406 may be in the form of a hash of the operation information 404 calculated by the lead server, over the operation information 404, using the lead server's private key. The signed operation command 402 may further comprise an indication of the identity of the server 110a.

Figure 5:
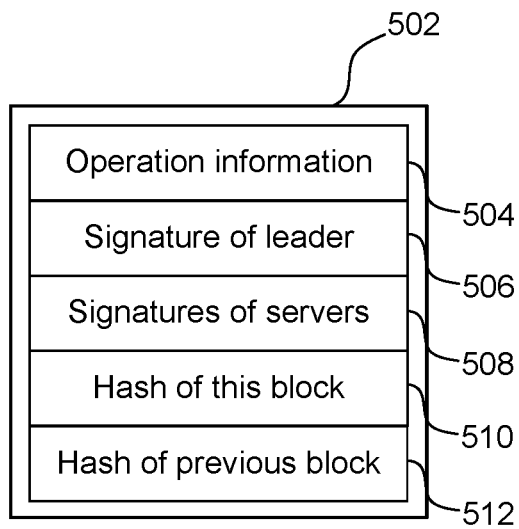
FIG. 5 illustrates the data components of a block of a first-layer blockchain, according to an embodiment.

FIG. 5—Components of Block of First-Layer Blockchain

FIG. 5 illustrates the data components a block of the first-layer blockchain 116a-c, according to an embodiment. For convenience, block 502 will be described in terms of having been generated by server 110a for inclusion in that server's blockchain 116a; however, it is to be understood that a block generated by another server (e.g. server 110b or 110c) in the database system 102 would comprise the same data components.

Block 502 comprises operation information 504. In one embodiment, the operation information 504 is a copy of the operation information 404 as provided in the signed operation command 402.

Block 502 further comprises the signature 506 of the lead server. In one embodiment, the signature of the lead server 506 is a copy of the signature of the lead server 406 as provided in the signed operation command 402.

Block 502 further comprises one or more signatures 508 of servers in the database system 102. In one embodiment, block 502 includes one signature from each of the servers who was not the elected lead server at the time the operation command was processed by the database system 102. Accordingly, if server 110a was elected lead server, block 502 would include server 110a's signature in item 506, and would include the signatures of servers 110b and 110c in item 508.

Block 502 further comprises a hash calculated over the information 504, 506 and 508, using the server's private key. Finally, block 502 comprises the hash of the previous block in the blockchain 116a.

Figure 6:
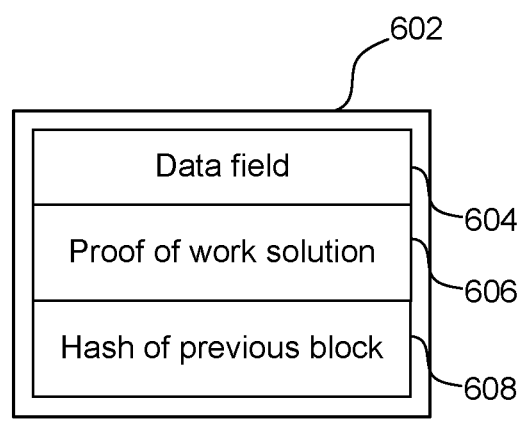
FIG. 6 illustrates the data components of a block of the second-layer blockchain, according to an embodiment.

FIG. 6—Components of Block of Second-Layer Blockchain

FIG. 6 illustrates the data components of a block of the second-layer blockchain 132a-e, according to an embodiment. For convenience, block 602 will be described in terms of having been generated by miner 130a for inclusion in that miner's blockchain 132a; however, it is to be understood that a block generated by another miner in the database system 102 would have the same data components.

Block 602 includes a data field 604 which stores data indicative of a portion of the blockchain 116a-c of the first-layer 104.

Block 602 further comprises a proof-of-work solution 606 associated with the data field 604. The proof-of-work solution may have been calculated by miner 132a, or may have been calculated by another miner associated with the second-layer blockchain (e.g. miners 132b-e). In one embodiment, the proof-of-work solution 606 further comprises information indicative of the identity of the miner that provided the proof-of-work solution.

Finally, block 602 comprises the hash 608 of the previous block in the second-layer blockchain 132a.

Figure 7:
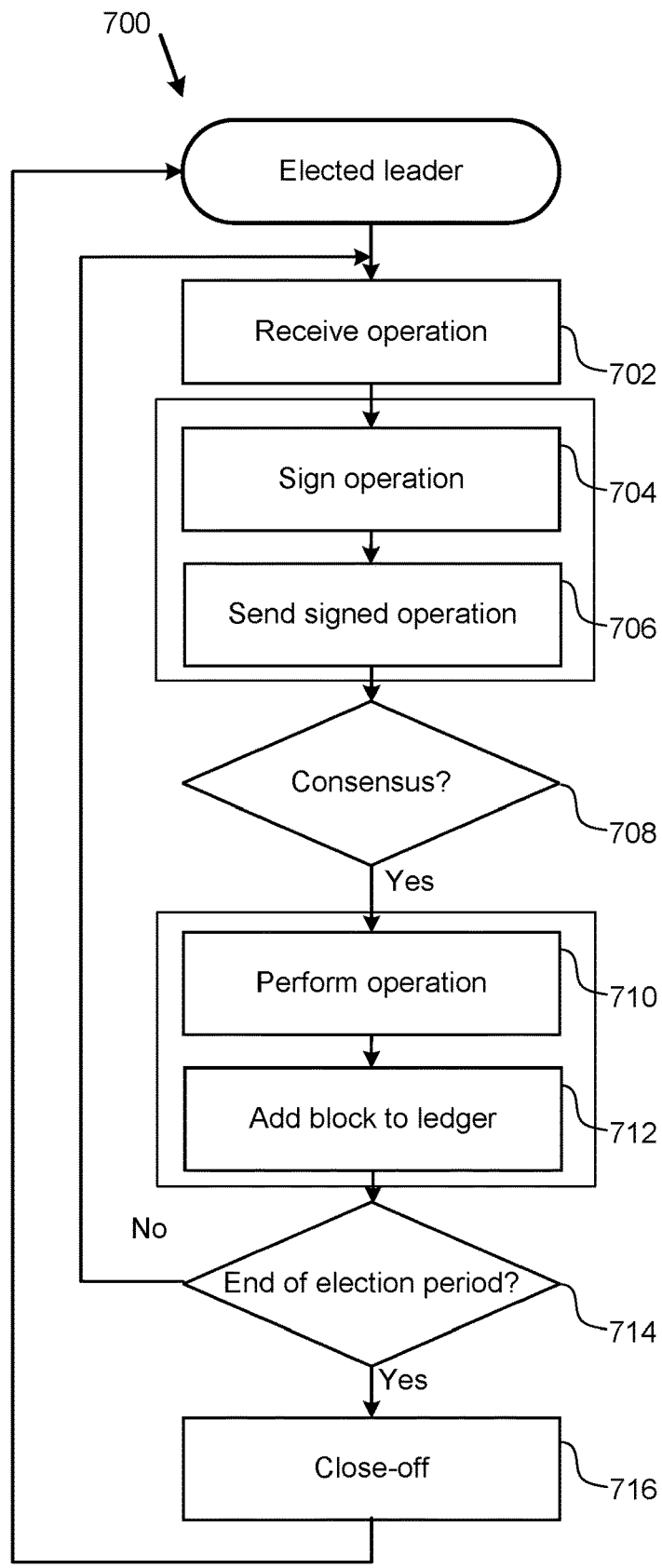
FIG. 7 is a flowchart illustrating a method performed by a server when the server is the elected lead server, according to an embodiment.

FIG. 7—Lead Server Method

FIG. 7 is a flowchart illustrating the steps taken by a server of the first-layer 104 when the server is in the lead server role, according to an embodiment. In one embodiment, method 700 is performed by the controller 204 of the server 110a, when server 110a is in the role of lead server.

At the start of method 700, the server 110a is elected to the lead server role. Once the server 110a is elected lead server, the server's controller 204 listens for database operation commands arriving on interface 108.

In step 702, the server 110a receives a new database operation command from the interface 108.

In step 704, the server 110a signs the new database operation command using the server's private key 212. In one embodiment, the server 110a signs the operation command by applying the private key 212 to the operation command to produce a hash. The hash forms the server's signature associated with the operation command. The server 110a concatenates the hash signature and the operation command to produce a signed operation command. An example format of a signed operation command is illustrated in FIG. 4

In step 706, the server 110a communicates the signed operation command to the other servers of the database system 102 by transmitting the signed operation command over the inter-server communication channel. In one embodiment, the server 110a broadcasts the signed operation command to the other servers of the database system. In an embodiment in which the servers are logically arranged in a communication sequence, the server 110a transmits the signed operation command to the next server in the sequence.

The combination of step 704 and step 706 form the server's indication of consent to perform the database operation on the server's database.

In step 708, the server 110a determines whether all the servers 120a-c of the database system 102 have reached consensus.

If all the servers 120a-c of the database system 102 have reached consensus, then the server 110a performs the database operation command, as received in step 702, to the server's database 114a. Additionally, the server 110a creates a new block recording the performed database operation, and appends the new block to the blockchain 116a.

End of Election Period

In step 714, the server 110a determines whether it is the end of the server's period as lead server. The determination in step 714 depends upon the algorithm used to determine the election period for a server. In one embodiment, the server 110a receives a signal from another server indicating that the election period is complete. In embodiments in which servers are elected lead server for a set period of time, the determination in step 714 may comprise a determination of the time passed since the server began the lead server role. In embodiments in which servers are elected lead server for a set number of database operations, the determination in step 714 may comprise a determination of the number of data operations performed while the server has been the lead server.

If the server 110a determines, in step 714, that the election period is not yet complete, the server 110a returns to step 702 to await reception of further database operation commands.

Close-Off

If the server 110a determines, in step 714, that the election period is complete, the server 110a performs close-off functions in preparation for another server taking on the role of lead server. Close-off functions may comprise determining the identity of the next server to be elected lead server. Close-off functions may comprise sending signals indicating the end of the election period for server 110a, resetting internal parameters or memory, informing the interface of the change in server leadership or sending a closing report to a monitoring entity.

Figure 8:
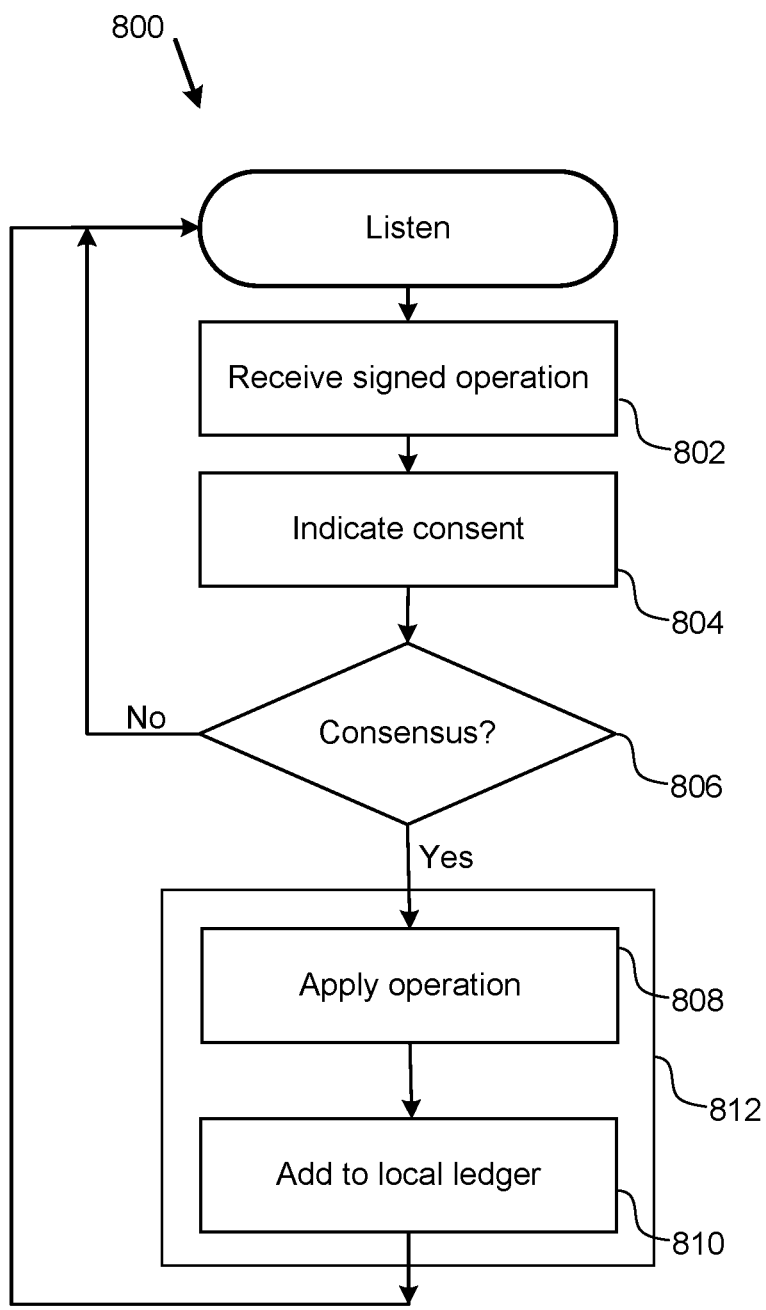
FIG. 8 is a flowchart illustrating a method performed by a server when the server is not the elected lead server, according to an embodiment.

FIG. 8—Server Method

FIG. 8 is a flowchart illustrating the method 800 performed by a server of the first-layer 104 when the server is not in the lead server role, according to an embodiment. Method 800 is described in relation to server 110b of the database system 103.

Method 800 starts with server 110b listening to receive a signed operation from the elected lead server. In step 802, server 110b receives a database operation command signed by the lead server. Server 110b uses the public key 214 associated with the lead server, and stored in memory store 210, to authenticate that the database operation command was actually signed by the lead server.

If server 110b cannot authenticate that the operation was signed by the elected lead server, then server 110b may raise and communicate an error alert. Alternatively, if server 110b cannot authenticate that the operation was signed by the elected lead server, then server 110b may ignore the signed operation received in step 802.

In step 804, server 110b adds its signature to the signed operation received in step 802. In one embodiment, the server 110b also communicates the signed operation that server 110b has also signed to one or more other servers, in accordance with the consensus mechanism. The combination of signing the signed operation and communicating the signed operation form the server's 110b indication of consent to perform the database operation on the server's 110b database 114b.

In step 806, server 110b determines, in accordance with the consensus mechanism previously described, whether all the servers of the database system 102 consent to the application of the database operation to the databases 114a-c. If the servers 110a-c have reached consensus, in step 808 server 110b applies the database operation to its database replica 114b. In step 810, server 110b creates a block recording the database operation, and appends the block to its blockchain 116b. Naturally, to ensure integrity of database 114b, steps 808 and 810 should be performed atomically, meaning that server 110b should ensure that both steps are performed to completion, or that neither step is performed.

Light Weight Consensus Mechanism and a Proof-of-Work Mechanism

The consensus mechanism applied by servers 110a-c of the first-layer 104 has a low latency and therefore enables a high throughput of database operations. However, the consensus mechanism of the first-layer 104 does not include a proof-of-work function, and therefore does not provide the same degree of data integrity certainty as a proof-of-work mechanism. The second-layer blockchain includes a proof-of-work function to enhance data integrity. The first and second-layer blockchains are linked through an anchoring function, which is described in more depth below.

Proof-of-Work Function

A proof-of-work function requires a participant miner to prove that a computationally complex and time consuming problem has been correctly solved. Numerous proof-of-work algorithms may be utilized to execute a proof-of-work function for a blockchain. For example, a proof-of-work function may be a hash function, or determining valid inputs to a complex mathematical function given the output, integer factorization or a guided tour puzzle protocol. For some algorithms, the answer to the proof-of-work problem is called a hash.

A proof-of-work function imposes limits on the addition of new blocks to a blockchain by only allowing participants who have solved the proof-of-work problem to determine new blocks to be added to the blockchain. Accordingly, the inclusion of a proof-of-work requirement to a blockchain implementation reduces the risk of malicious manipulation of the blockchain, because to manipulate a block of a blockchain, an attacker would need to reproduce the chained hash values for all the following blocks of the blockchain, solving the proof-of-work problem before adding each block. Therefore, such an attack would require an unworkably large amount of computational power and time.

Blockchain Anchoring Function

The interaction with the second-layer blockchain is realized via a blockchain anchoring function. The anchoring function links a specific portion of the first-layer blockchain with a block of the second-layer blockchain.

The anchoring function is performed in response to an anchoring event, such as a time interval, or a set number of database operations performed on the databases 114*a-c* of the database system 102.

In response to the anchoring event, the second-layer 106 of the database system 102 appends a new block to the second-layer blockchain 132*a-e*. The new block comprises a bulk record of a portion of the first-layer blockchain, ending with the most recently appended block to the first-layer blockchain. Consequently, the bulk record is stored as an immutable, irreversible record in the second-layer blockchain.

Once an anchoring function has been performed, the recently appended block of the first-layer blockchain is known as the last anchored block. Blocks appended to the first-layer blockchain after the last anchored block may be anchored to the second-layer blockchain in response to a subsequent anchoring event.

In one embodiment, the portion of the first-layer blockchain that is stored in the new block of the second-layer blockchain (this portion also known as the 'anchor data') comprises all the data stored for each first-layer block from the last anchored block to the most recently appended block. In another embodiment, the portion of the first-layer blockchain that is stored in the new block of the second-layer blockchain comprises only the hash values 510 of each first-layer block from the last anchored block to the most recently appended block Triggering the Anchoring Function In one embodiment, the elected lead server monitors for the occurrence of the anchoring event by maintaining a timer and triggers the anchoring function at the completion of a period of time of a predefined length. More specifically, in one embodiment, the server 110*a-c* that is in the role of the elected lead server performs the anchoring function every minute. When the role of elected lead server changes to another server 110*a-c*, the new elected lead server is responsible for performing the anchoring function.

Performing the Anchoring Function

When the lead server determines that an anchoring event has occurred, the lead server communicates anchor data to the second-layer interface 112 via communication channel 126. As detailed above, anchor data is a portion of the first-layer blockchain.

The second-layer interface 112 communicates the anchor data to each of the miners 130*a-e* of the second-layer 106. In response to receiving the anchor data, the miners perform method 900, as described in FIG. 9.

Figure 9:
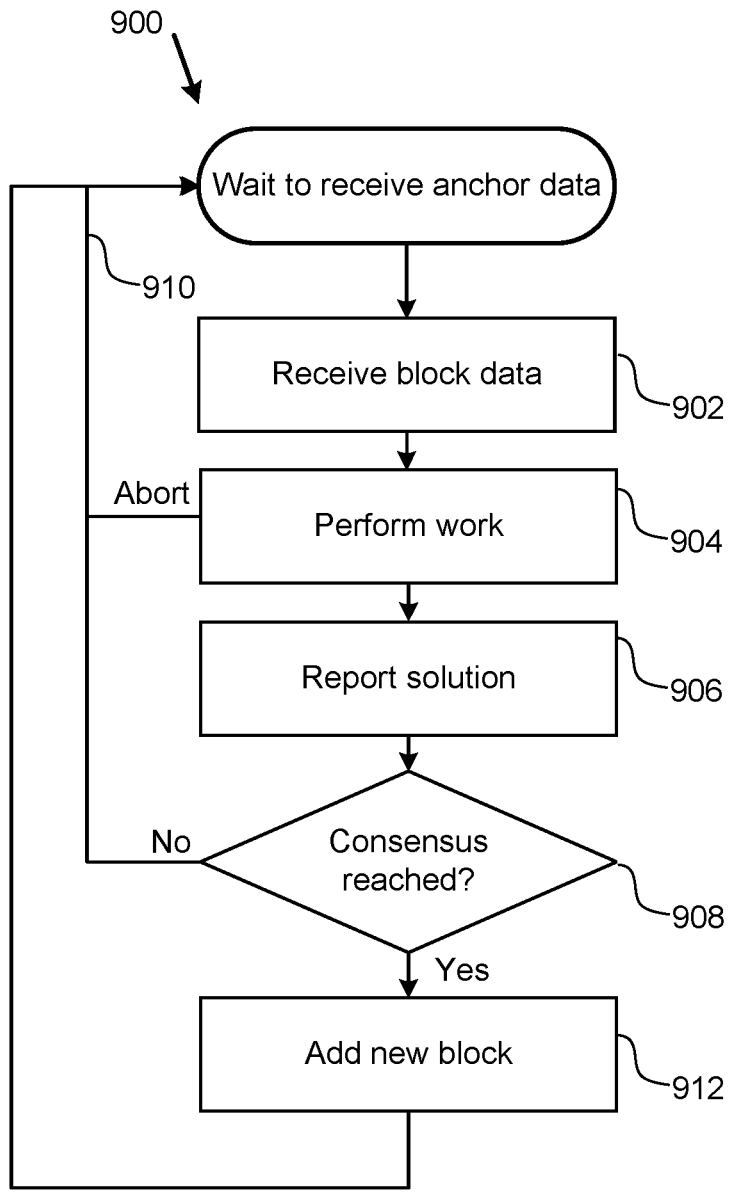
FIG. 9 is a flowchart illustrating a method performed by a miner, according to an embodiment.

FIG. 9—Miner Method

FIG. 9 is a flowchart illustrating the steps taken by a miner of the second-layer 106 in response to receiving anchor data from interface 112, according to an embodiment. Method 900 will be described as performed by processor 304 of the miner 130*a*; however, it is noted that method 900 is also started by each of the other miners 130*b-e* of the database system 102, such that the miners 130*a-e* start method 900 substantially in parallel.

In step 902, the miner receives and stores the anchor data. In step 904, the miner performs the computations of work function with the aim of determining a solution to the work function.

If the miner 130*a* determines that it has identified a solution to the proof-of-work problem, for the received anchor data, the miner 130*a* reports the solution in step 906. In one embodiment, the miner 130*a* reports the solution by broadcasting the solution to the other miners 130*b-e* in the database system 102. In another embodiment, the miner 130*a* reports the solution by sending communication to the interface 112, which then communicates to the other miners 130*b-e* that miner 130*a* has identified a solution to the proof-of-work problem.

Each of the other miners 130*b-e* then digress from their execution of method 900 to determine whether they agree that the solution identified by miner 130*a* is the correct solution. As noted above, the computation required for verifying whether a proof-of-work solution is correct or not is relatively simple compared to the computation required for determining the solution to the proof-of-work problem.

Each of the miners 130*b-e* then provide communication to miner 130*a* to indicate whether they consider that the solution identified by miner 130*a* is the correct solution. In one embodiment, if more than half of the miners 130*a-e* consider that the solution identified by miner 130*a* is the correct solution, miner 130*a* earns the right to add a new block to the second-layer blockchain.

In step 912, miner 130*a* adds a new block to the second-layer blockchain 132*a*. In one embodiment, the new block is in the format illustrated in FIG. 6.

If, whilst miner 130*a* is performing the work in step 904, another miner identifies the proof-of-work solution, miner 130*a* aborts or pauses step 904 and verifies whether the other miner's solution is valid. If the other miner's solution is valid, and consensus is reached amongst more than half of the miners, miner 130*a* adds a new block to blockchain 132*a* in accordance with the other miner's solution.

Advantages of the Two-Layer Blockchain Architecture

The use of blockchain ensures not only data integrity, but also provides fully distributed control of the database data. This intrinsic characteristic makes embodiments of the present disclosure practicable for use in the context of federation-as-a-service architectures.

Due to the two-layer blockchain architecture, manipulation of the record of operations performed on a database is computationally infeasible. By way of example, consider a threat in which an attacker seeks to violate the integrity of the data by directly altering part of a database. To succeed in an undetected alteration of data in a database 114*a-c*, an attacker would also need to alter the database operation records stored in the distributed ledgers of the first-layer blockchain 116*a-c*. At the very least, an attacker would need to compromise more than half of the servers of the first-layer, and alter the ledger of these servers. As discussed previously, to alter a block of the blockchain, it is necessary to also recalculate the hash values for all subsequent blocks in the blockchain. The effort required for an attacker to achieve this is high.

In the setting of a federation-as-a-service implementation, an attacker would need to attack multiple distributed cloud providers simultaneously. Even if this situation occurs, the anchoring of the first-layer blockchain with the second-layer blockchain ensures that only the latest set of operations on the database can be manipulated by an attacker. All the other operations are testified by immutable irreversible records stored on the second-layer blockchain. Due to the proof-of-work function applied to the second-layer blockchain, an alteration of a block of the second-layer blockchain, to reflect an alteration of a block of the first-layer blockchain would be a computation task that is infeasible for an attacker.

Collusion attacks are another form of attack that may threaten a distributed database system. The private keys are all of the servers of the first-layer blockchain are required to sign the messages needed to complete a database operation. Therefore, in the event that one or more servers are corrupted, an uncorrupted server could prevent the completion of a malicious database operation by not applying its signature to the database operation message during the first-layer consensus protocol.

If a collusion attack was instead aimed to alter information already stored in the first-layer blockchain, this means that such information has been previously agreed on by all the members, an uncorrupted server would still retain evidence of operations previously signed by all servers, and performed on the databases.

A server may operate in a networked environment supporting connections to one or more remote computers, such as client devices and/or client machines. A client device may be a personal computer, mobile device, laptop computer, tablet, or a server that include many or all of the elements described above with respect to the computing device. A server may be a computing device such as a personal computer, web server, data server, set of processing devices, virtual machine or a combination thereof.

A miner may operate in a networked environment supporting connections to one or more remote computers. A miner may comprise a single computing device, a set of interworking computing devices, a distributed computing environment, or an application or applications executing on one or more computing devices.

The embodiments described herein, and the figures provided herein, provide examples of network architectures and processing devices that may be used. Those of skill in the art will appreciate that the specific network architecture and data processing devices used may vary, and are secondary to the functionality that they provide, as described herein.

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device.

The computer executable instructions may be stored on a computer readable medium such as a non-volatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGAs), and the like. Particular data structures may be used to more effectively implement one or more aspects described herein, and such data structures are contemplated within the scope of computer executable instructions and computer-usable data described herein.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system comprising:
a plurality of servers configured to replicate a database across the plurality of servers, each server comprising:
a replicated database corresponding to a copy of the database;
a controller processor configured to perform database operations on the replicated database of that server; and
a blockchain of a first distributed ledger, wherein:
the blockchain of the first distributed ledger comprises a plurality of records of database operations performed on the replicated database; and
the controller processor is further configured to store a new record to the blockchain of the first distributed ledger of that server responsive to processing a new database operation on the replicated database; and
at least one miner configured to authenticate the blockchain of the first distributed ledger, each miner comprising:
a miner hardware processor configured to:
receive, from the plurality of servers, a record of data indicating one or more records stored in the blockchain of the first distributed ledger; and
perform a proof-of-work function; and
a blockchain of a second distributed ledger, wherein:
the blockchain of the second distributed ledger comprises a plurality of records of data indicating one or more records stored in the first distributed ledger; and
the miner hardware processor is further configured to store a new record to the blockchain of the second distributed ledger responsive to a proof-of-work function being solved for a new record of data indicating one or more records stored in the blockchain of the first distributed ledger.

2. The system of claim 1, wherein:
each server of the plurality of servers is further configured to, in response to receiving a command to perform a database operation:
indicate consent to perform the database operation; and
determine, by applying a consensus mechanism, that each server of the plurality of servers consents to perform the database operation; and
performing the database operation on the replicated database of that server is responsive to determining that each server of the plurality of servers consents to perform the database operation.

3. The system of claim 1, wherein:
the record of data indicating one or more records stored in the blockchain of the first distributed ledger is an anchor data received responsive to an anchoring event;
the miner hardware processor is further configured to complete, responsive to the anchoring event, a proof-of-work operation based on the anchor data and the proof-of-work function; and
the new record stored to the blockchain of the second distributed ledger includes a proof-of-work solution from completing the proof-of-work operation.

4. A method comprising:
replicating a database across a plurality of servers, wherein each server of the plurality of servers includes a replicated database corresponding to a copy of the database;
performing, by each server of the plurality of servers, database operations on the replicated database of that server;
recording, by each server of the plurality of servers and in a blockchain of a first distributed ledger in that server, a plurality of records indicating operations performed on the replicated database of that server
receiving, by at least one miner and from the plurality of servers, a record of data indicating one or more records stored in the blockchain of the first distributed ledger;
performing, by the at least one miner, a proof-of-work function; and
recording, by the at least one miner and in a blockchain of a second distributed ledger in the at least one miner, a record indicating the one or more records stored in the blockchain of the first distributed ledger.

5. The method of claim 4, further comprising:
completing, by the at least one miner and responsive to an anchoring event, a proof-of-work operation based on the proof-of-work function and an anchor data, wherein:
the anchor data includes one or more records stored in the blockchain of the first distributed ledger; and
recording the record indicating the one or more records stored in the first distributed ledger is based on the anchor data.

6. The method of claim 5, further comprising, for each server of the plurality of servers and in response to receiving a command to perform a database operation:
consenting to perform the database operation on the replicated database of that server;
determining, by applying a consensus mechanism, that consent has been given to perform the database operation;
performing, responsive to determining that consent has been given, the database operation on the replicated database of that server; and
recording, in the blockchain of the first distributed ledger, a record of the performed database operation.

7. The method of claim 6, further comprising:
performing, by one server of the plurality of servers, a role of lead server in accordance with an election protocol.

8. The method of claim 7, wherein the election protocol defines an election of each server of the plurality of servers to the role of lead server in turn.

9. The method of claim 7, wherein the consensus mechanism comprises:
receiving, by the lead server, operation information indicating a database operation;
producing, by the lead server, an indication of consent to perform the database operation on the replicated database of the lead server; and
communicating, by the lead server, the indication of consent to one or more of the servers of the plurality of servers.

10. The method of claim 9, further comprising:
determining, by the lead server, the indication of consent by cryptographically signing the operation information using a private cryptographic key of the lead server.

11. The method of claim 5, further comprising:
performing, by one server of the plurality of servers, a role of lead server in accordance with an election protocol; and
signaling, by the lead server, the anchoring event to the at least one miner.

12. The method of claim 5, wherein the anchor data comprises hash values indicating operations performed on the plurality of databases.

13. The method of claim 5, wherein:
the anchoring event is signaled periodically based on a time interval; or
the anchoring event is signaled based on a number of operations performed on the plurality of databases.

14. The method of claim 5, wherein the at least one miner comprises a plurality of miners, further comprising, by each miner of the plurality of miners and in response to receiving a proof-of-work solution determined by another miner of the plurality of miners:
determining whether the proof-of-work solution is valid; and
in response to determining that the proof-of-work solution is valid, recording, in the blockchain of the second distributed ledger of that miner, a record based on the anchor data.

15. The method of claim 6, wherein the consensus mechanism comprises producing, for each server of the plurality of servers, an indication of consent to perform the database operation on the replicated database of that server.

16. A system comprising:
a plurality of servers configured to replicate a database across the plurality of servers, each server comprising:
a server processor;
a server computer readable storage medium;
a replicated database corresponding to a copy of the database;
a blockchain of a first distributed ledger, wherein the blockchain of the first distributed ledger comprises a plurality of records of database operations performed on the replicated database; and
means, stored in the server computer readable storage medium for execution by the server processor, for:
performing database operations on the replicated database of that server; and
storing a new record to the blockchain of the first distributed ledger of that server responsive to processing a new database operation on the replicated database; and
at least one miner configured to authenticate the blockchain of the first distributed ledger, each miner comprising:
a miner hardware processor;
a miner computer readable storage medium;
a blockchain of a second distributed ledger, wherein the blockchain of the second distributed ledger comprises a plurality of records of data indicating one or more records stored in the first distributed ledger; and means, stored in the miner computer readable storage medium for execution by the miner hardware processor, for:

receiving, from the plurality of servers, a record of data indicating one or more records stored in the blockchain of the first distributed ledger;

performing a proof-of-work function; and storing a new record to the blockchain of the second distributed ledger responsive to a proof-of-work function being solved for a new record of data indicating one or more records stored in the blockchain of the first distributed ledger.

17. The system of claim 2, wherein:

one server of the plurality of servers is configured to perform a role of lead server in accordance with an election protocol; and the lead server is configured to:

receive operation information indicating a database operation;

produce an indication of consent to perform the database operation on the replicated database of the lead server; and communicate the indication of consent to one or more of the servers of the plurality of servers.

18. The system of claim 17, wherein the lead server is further configured to:

determine the indication of consent by cryptographically signing the operation information using a private cryptographic key of the lead server.

19. The system of claim 3, wherein:

one server of the plurality of servers is configured to perform a role of lead server in accordance with an election protocol; and the lead server is configured to signal the anchoring event to the at least one miner.

20. The system of claim 3, wherein:

the at least one miner comprises a plurality of miners; and each miner of the plurality of miners is further configured to, in response to receiving a proof-of-work solution determined by another miner of the plurality of miners:

determine whether the proof-of-work solution is valid; and in response to determining that the proof-of-work solution is valid, record, in the blockchain of the second distributed ledger of that miner, a record based on the anchor data.

\* \* \* \* \*